Feb. 12, 1963
M. R. KONDOLF
3,077,033
FULCRUM
Filed Feb. 12, 1959
3 Sheets-Sheet 1
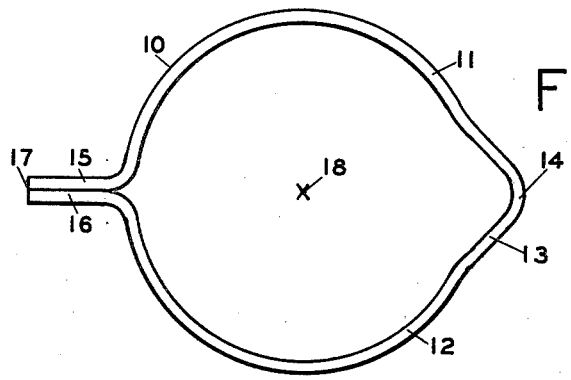
FIG. 1
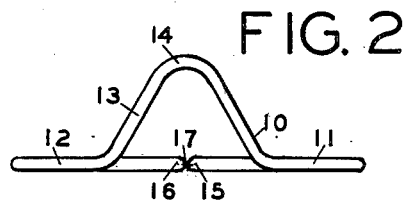
FIG. 2
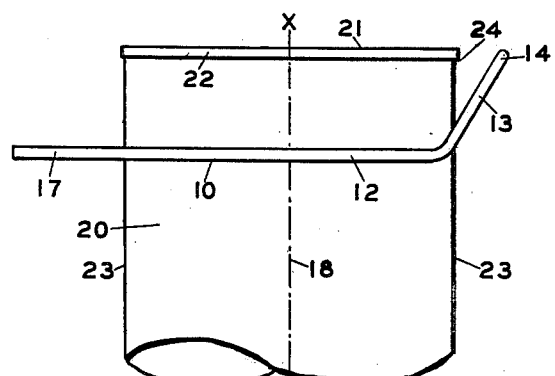
FIG. 3
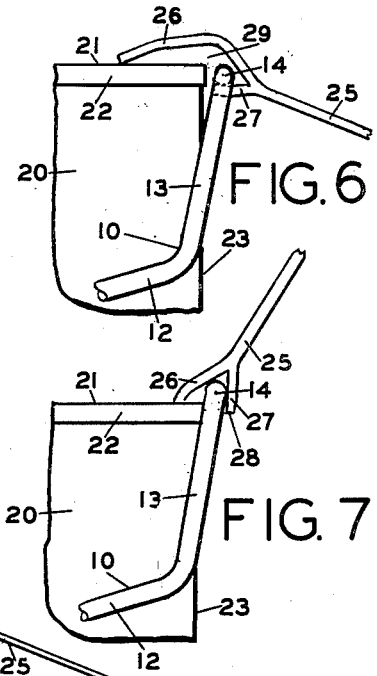
FIG. 6
FIG. 7
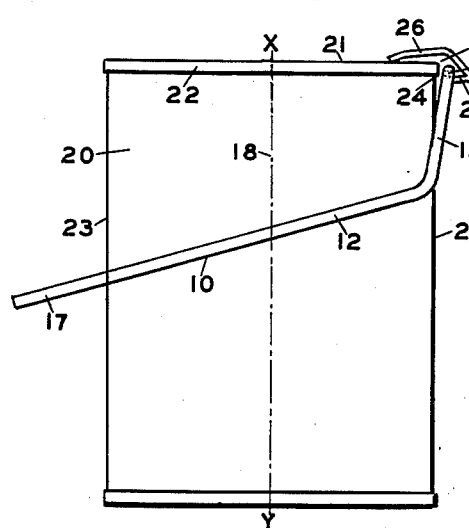
FIG. 4
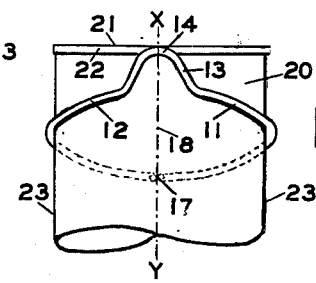
FIG. 5
INVENTOR.
Mathias R. Kondolf Feb. 12, 1963 — M. R. KONDOLF — 3,077,033
FULCRUM
Filed Feb. 12, 1959 — 3 Sheets-Sheet 2
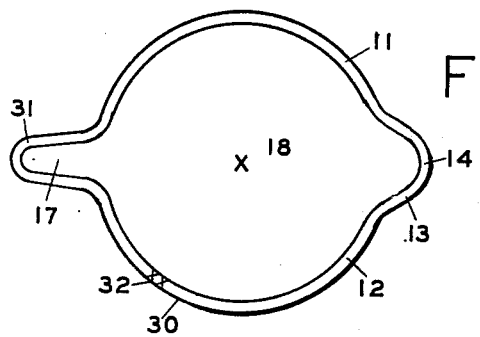
FIG. 8
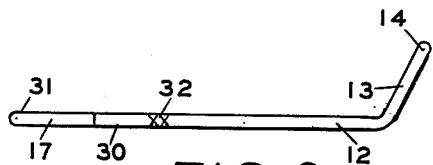
FIG. 9
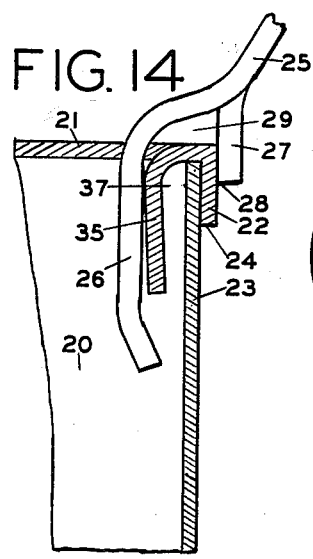
FIG. 14
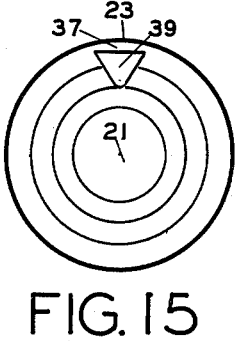
FIG. 15
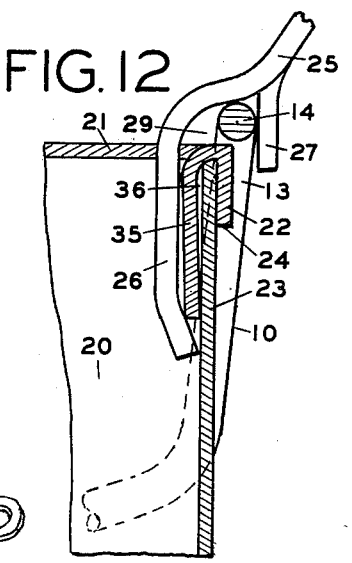
FIG. 12
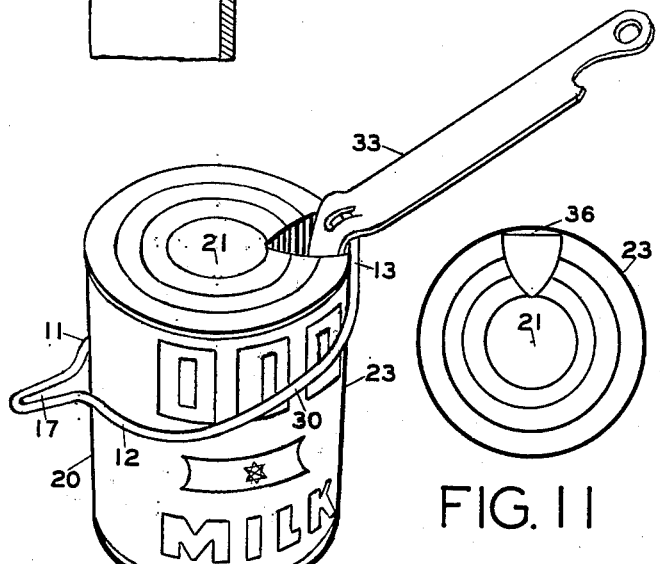
FIG. 10
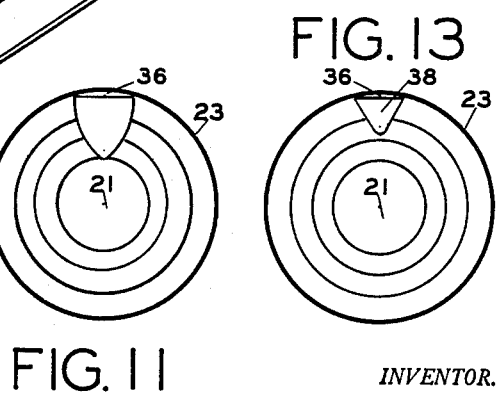
FIG. 13
FIG. 11
INVENTOR.
Mathias R. Kondolf Feb. 12, 1963  M. R. KONDOLF  3,077,033
FULCRUM
Filed Feb. 12, 1959  3 Sheets-Sheet 3
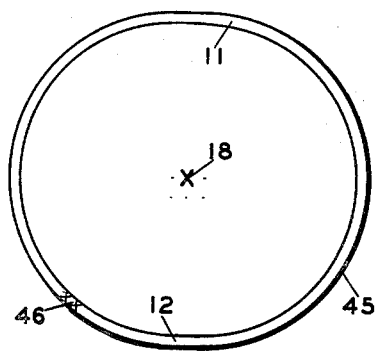
FIG. 16
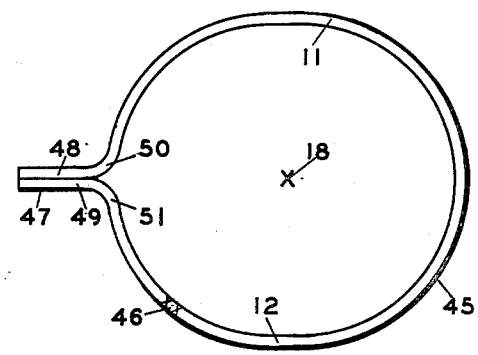
FIG. 19
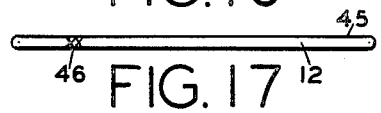
FIG. 17
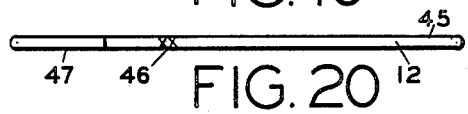
FIG. 20
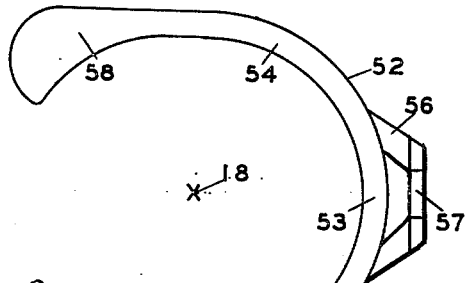
FIG. 23
FIG. 24
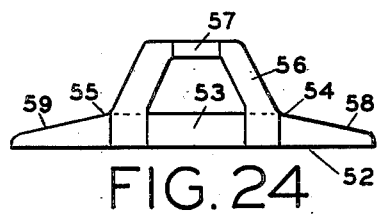
FIG. 21
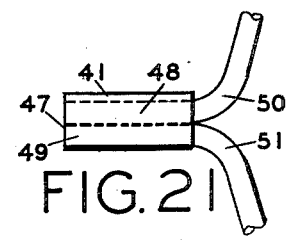
FIG. 22
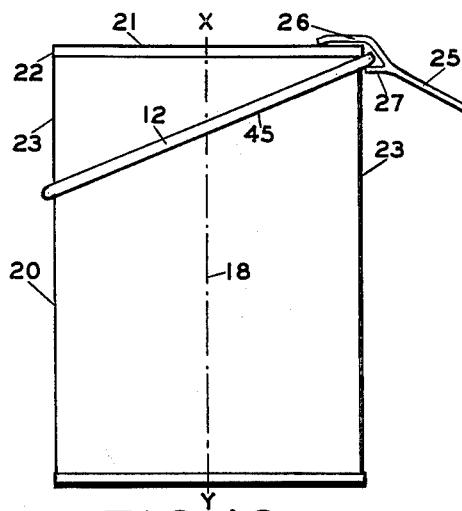
FIG. 18
INVENTOR.
Mathias R. Kondolf

United States Patent Office 3,077,033
Patented Feb. 12, 1963

3,077,033
FULCRUM
Mathias R. Kondolf, Bel Alton, Md.
(Holcomb, N.Y.)
Filed Feb. 12, 1959, Ser. No. 792,867
7 Claims. (Cl. 30—1)

This invention relates to a fulcrum for use on a can, to provide a ledge which may be engaged by a standard can puncturing tool to open the can.

A principal object of the invention is to provide a fulcrum which may be either stamped from sheet metal, cast, or formed from wire, at very low cost and may be easily applied for the more efficient opening of a can in cooperation with the standard lever puncturing tools now in common use.

An important object of the invention is to enable standard can puncturing tools, which are designed for use in opening a can with beaded closures, to be used efficiently to open cans with flanged closures, such as cans generally used to pack evaporated milk.

An important object and new result secured by the invention is the ability through its use to form in the can end, with a standard lever puncturing tool, an aperture which extends to the can wall and thereby permit the complete emptying of the contents of the can through such aperture.

An important object of the invention is to provide a fulcrum which may be easily applied to a can body and thereafter, by a tilting motion of the fulcrum, caused to grip the can body by frictional engagement therewith.

An important object of the invention is to provide a fulcrum which has a degree of flexibility or stretch to better frictionally grip the can body.

An important object of the invention is to provide a fulcrum to be applied to a can of evaporated milk to enable the opening thereof by a standard can puncturing tool under conditions where the tool, by reason of a dull or rounded can engaging member, cannot be used alone to open said can in normal operation of said tool.

FIG. 1 is the plan view of one species of the fulcrum.

FIG. 2 is an elevation of the fulcrum shown in FIG. 1.

FIG. 3 is a diagrammatic view of the upper portion of a cylindrical can showing the position of the fulcrum of FIG. 1 when first applied to the can.

FIG. 4 is a diagrammatic view of a can showing the fulcrum of FIG. 1 after same has been tilted on the can body.

FIG. 5 is a diagrammatic elevation of the upper part of the can of FIG. 4 showing the fulcrum of FIG. 1 in tilted position.

FIG. 6 is a diagrammatic view to enlarged scale showing a portion of a can and the position of a can top puncturing tool when first engaged with the fulcrum.

FIG. 7 is a diagrammatic view of a portion of a can showing the position of a can top puncturing tool after an aperture has been punched or cut into the can top.

FIG. 8 is a plan view of a different species of the fulcrum.

FIG. 9 is an elevation of the fulcrum shown in FIG. 8.

FIG. 10 is a perspective view of a milk can with the fulcrum of FIG. 8 frictionally locked thereon and showing an aperture cut into the can top by a puncturing tool engaged with the fulcrum.

FIG. 11 is a view of the top end of the can of FIG. 10 after the aperture has been cut therein.

FIG. 12 is a view to an enlarged scale of a cross section taken on a plane radial to the longitudinal axis of the can shown in FIG. 4 to show the position of the cut sector of the can top after same is bent into the can in close proximity to the can wall by the cooperation of the fulcrum with a standard puncturing tool.

FIG. 13 is a view of the top end of the can of FIG. 12 after an aperture has been cut therein.

FIG. 14 is a view to an enlarged scale of a cross section taken on a plane radial to the longitudinal axis of the can shown in FIG. 4 to show the position of the cut sector of the can top after same is bent into the can in spaced position from the can wall by the use, alone, of a standard puncturing tool.

FIG. 15 is a view of the top end of the can of FIG. 14 after the aperture has been cut therein.

FIG. 16 is a plan view of a different species of the fulcrum.

FIG. 17 is an elevation of the fulcrum shown in FIG. 16.

FIG. 18 is a diagrammatic view of a can with the fulcrum of FIG. 16 frictionally locked thereon and showing the position of a can puncturing tool when first engaged with the fulcrum.

FIG. 19 is the fulcrum of FIG. 16 provided with sections to form a handle thereon.

FIG. 20 is an elevation of the fulcrum shown in FIG. 19.

FIG. 21 is a sectional plan view of the handle end of the fulcrum shown in FIG. 19, and the similar handle end of the fulcrum shown in FIG. 1, when covered with an oval tube.

FIG. 22 is an elevation of the handle end shown in FIG. 21.

FIG. 23 is a plan view of a different species of the fulcrum.

FIG. 24 is an elevation of the fulcrum shown in FIG. 23.

Referring to FIG. 1, reference numeral 10 designates a fulcrum formed of wire preferably .060 to .125 inch in diameter. The fulcrum 10 is formed with arc sections 11 and 12 connected by a loop section 13, having an upper end 14, at one side, and by sections 15 and 16 forming a handle 17 at the opposite side of said fulcrum. The sections 14 and 15 may be either welded, brazed or twisted, or otherwise fastened together, so that they will be held in fixed relation to each other. The position of the longitudinal axis of the can, to which the fulcrum is applied, is shown by the numeral 18.

Referring to FIG. 3, the numeral 20 designates the can body having a longitudinal axis x—y 18 and provided with the can end or top 21. The end 21 engages the can body by means of the overlapping flange 22. This flange 22, on the type of can for which the fulcrum is particularly adapted for use, only protrudes from the can wall the thickness of the sheet material from which the can end is made. This material or stock is usually tin plate approximately one one-hundredth of an inch in thickness.

In FIG. 3 the initial position of the fulcrum 10 is shown when it is first applied to a can in a transverse plane substantially at right angles in all directions to the longitudinal axis 18 of the can. The dimensions of the fulcrum 10 permit the application and the sliding of the fulcrum along the can circular wall 23, while the fulcrum is maintained in a transverse plane substantially at right angles, or perpendicular, to the longitudinal axis 18 of the can.

Referring to FIG. 4, the handle 17 of the fulcrum 10 has been depressed as shown and this causes the fulcrum to be tilted into a plane which, in the direction from the loop 13 to the handle 17, is deflected from the initial right angle transverse position shown in FIG. 3.

When the fulcrum is pressed into a tilted position on the can body, as shown in FIG. 4, the fulcrum engages the can body and is frictionally held against sliding over said body.

In use the fulcrum 10 assumes a slightly oval shape when it is tilted at an angle to the longitudinal axis of a can and is frictionally held against sliding on the can body. This oval shape arises partly from the reduction of the clearance allowed to enable the easy application of the fulcrum to the can body and partly from a change in the angle of the loop section 13, caused by the upward force on the loop, of the tool used to puncture the can top.

As shown in FIG. 4 the upper end 14—of the loop 13 of the fulcrum 10—has been moved into close proximity to the can wall, by reason of the tilting of the fulcrum. The end 14 of the loop 13 thus provides an ample secure ledge means for the tool 25 to engage during the can opening operation.

FIG. 6 shows the position of the fulcrum loop 13 and upper end 14 applied to the can as shown in FIG. 4 but to an enlarged scale, and FIG. 7 shows the same view of the can after the tool 25 has been moved upwardly to puncture and cut the can top 21. It will be noted that the loop 13 is raised slightly from its position as shown in FIG. 6. This occurs because of the upward force applied by the tool 25, and results in tightening the fulcrum 10 around the can wall 21 and securing an increased frictional grip thereon.

A standard type of can puncturing tool 25 is used to open the can. This type of tool is provided with a puncturing and cutting member 26 and a can engaging member 27 having an end 28. See FIGS. 7 and 14. In prior use (without applicant's fulcrum) in opening a can like that shown in FIG. 4, the end 28 of the member 27 engages under the edge 24 of the can flange 22 to provide a support ledge for the tool in the can puncturing operation. As stated above the flange 22 is very thin (one one-hundredths of an inch thick) and therefore affords a poor ledge or protuberance for the tool to engage under. In fact, if the can engaging end 28 of the tool is even slightly rounded, it becomes impractical and very often impossible to operate the tool and open such cans, because the end 28 slips off of the lower edge 24 of the flange, upon application of the force necessary to puncture the can top. See FIG. 14.

The distance 29 between the can engaging member 27 and the puncturing member 26 is quite uniformly the same in standard can end puncturing tools. This type tool is designed primarily to open cans which are provided with ends secured to the can bodies by beads. These beads protrude about sixty-five thousandths of an inch from the can wall and therefore provide a good ledge for the member 27 of the tool to engage under during the can opening operation.

An important feature of applicant's invention is to provide a simple device, very low in cost, whereby these standard can openers, which are now available in almost every household, can be easily used to open evaporated milk cans, or any cans which do not have a bead or other ledge around the can top.

FIG. 8 and FIG. 9 are views of another species of the fulcrum 30. In this variation the arc sections 11 and 12 are connected as in FIG. 1, by the loop 13 at one side of the fulcrum but the opposite handle end is formed by bending the wire material into a loop 31. In this species of fulcrum the wire material is welded or brazed as designated at 32 to form a one piece ring. The joint 32 may be either of the butt or overlap type, although it is shown as a butt joint in FIGS. 8 and 9.

The fulcrum 30 shown in FIG. 8 is applied to a milk can 20 as shown in the perspective view of FIG. 10. The tool 33 shown in FIG. 10 is a standard can puncturing tool of similar design but which cuts a larger opening of different shape than the tool 25 shown in FIG. 4. The opening cut by tool 33 is shown in FIG. 11. The opening cut by tool 25 is shown in FIG. 13.

FIGS. 12 and 14 show a novel feature of the invention which is of importance and of great utility in the art of opening cans by puncturing the top thereof. FIG. 12 is a cross sectional view of a can constructed with an overlapping flanged top, such as the can 20 shown in FIG. 4 and which can has been punctured, or opened, by the use of one of the standard tools such as 25 hereinbefore described, operated in connection with any of the several species of fulcrum such as 10 included within the scope of applicant's invention. Referring to FIG. 12 the can end 21 has been punctured and the sector 35 cut from the end 21 has been forced downwardly into the can. The loop 13 with the loop end 14 (both being part of the fulcrum 10) are spanned by the tool 25 and the fulcrum is in contact with the can wall 23. As shown, the can engaging member 27 of the tool 25 is held away from the can flange and wall by the fulcrum and this results as shown in sector 35 being bent down in very close contact with the inside of the can wall 23, leaving a narrow space 36 between the cut sector 35 and the can wall 23. FIG. 13 is a plan view of the can end 21 showing the aperture 38 which results when the sector 35 is cut from the can top 21 and bent into the can by the tool 25, leaving the narrow space 36 between the sector and the can wall.

FIG. 14 is a cross-sectional view of a similar can 20 as shown in FIG. 4 which has been punctured, or opened, by the use of one of the standard tools, such as 25, operated in the usual manner, without the use of any of the several species of novel fulcrum specified herein. It will be noted that the sector 35 when forced into the can by the tool 25, is not forced into close contact with the wall 23, and a wide space 37 exists between the sector 35 and the wall 23. This result is caused by the can engaging member 27 of the tool 25, making direct contact with the can flange 22 and therefore the cut for the sector 35 is ended and the sector 35 is bent into the can, at a substantial distance from the can wall 23. FIG. 15 is a plan view of the can end 21 showing the aperture 39 made in the can end by the tool 25 as shown in FIG. 14. The wide space 37 between the sector 35 and the can wall 23 may be compared with the corresponding narrow space 36 shown in FIG. 13, which is a plan view of the aperture in the can end resulting from the use of applicant's fulcrum in opening a similar can with the same tool 25.

The novel result of an aperture which extends substantially to the can wall being cut in the can end by the use of a standard puncture tool operation in cooperation with the fulcrum specified herein is of unexpected importance in the opening and use of the contents of milk cans, since it permits the entire contents of the can to be emptied. If a wide space 37 is left between the aperture and the can wall as shown in FIG. 14 it becomes very difficult, if not practically impossible to fully empty the can and with a product which spoils upon exposure to air, the partly emptied cans are objectionable because of odor and sanitary reasons.

FIG. 16 and FIG. 17 show a different species of the invention specified herein. Reference numeral 45 designates this species of the fulcrum which consists of a slightly oval shaped ring of wire or other suitable material. In the form shown in FIG. 16 the ends of the wire are joined at 46 by welding as shown at 32 in FIG. 8.

The fulcrum 45 is shown in FIG. 18 as being applied and pressed down into tilted position on a can 20. A standard can puncturing tool 25 is shown in position to open the can. It will be noted from FIG. 18 that the can engaging member 27 of the tool 25 is placed under the fulcrum 45, which serves as a ledge to hold the tool during the can puncturing and cutting operation. The aperture 38 shown in FIG. 13, with the cut sector 35 being forced into close position with the can wall 23 is obtained with the use of this species of fulcrum.

The use of the fulcrum 45 is somewhat more difficult than the use of the other species of fulcrum shown herein, since no handle is provided on the fulcrum 45 for use in pressing the fulcrum into tilted position after its application to the can to obtain a frictional grip on the can. The pressure to tilt the fulcrum 45 must be applied directly on the relatively small diameter oval ring.

FIG. 19 and FIG. 20 show the addition of a handle 47 to the oval shaped ring species of fulcrum 45 shown in FIG. 16. The handle 47 is formed by bending end sections 48 and 49 to project from the ring section 45. The sections 48 and 49 may be either welded, brazed or twisted or otherwise fastened together so that they will be held in fixed relation to each other. If desired the radius of the bends 50 and 51 may be increased to afford more spring action or stretch in the fulcrum and thereby make it easier to apply and use in opening a can. The fulcrum shown in FIG. 1 and in FIG. 8 each possess this spring action feature.

FIG. 21 and FIG. 22 show views of a preferably oval tube 41 which may be applied over the sections 48 and 49 to hold these sections in position and to improve the handling of the fulcrum by providing a smooth surface for the handle 47. This tube 41 can also be used in connection with fulcrum 10, shown in FIG. 1.

In the species of the fulcrum shown in FIG. 23 and in FIG. 24 the fulcrum in use does not extend completely around the can body. Referring to FIG. 23 the fulcrum 52 consists of a yoke member 53 which extends around the can for more than half of the perimeter of the can wall and the integral arc sections 54 and 55 which are to contact the can circular wall, are slightly oval in shape, to permit the fulcrum to be tilted into a plane other than perpendicular to the longitudinal axis of the can, and thereby secure frictional engagement of the fulcrum with the can wall and hold the fulcrum from sliding over the can wall. The fulcrum 52 is provided with an integral loop or solid angular section 56 having a top section 57 which, in the use of the fulcrum, provides a ledge under which a standard can puncturing tool can be engaged during the operation of puncturing the end of the can to open same. The fulcrum 52 may have flattened sections 58 and 59 integral with the ends of the yoke 53 to provide areas for use in pressing the yoke into the tilted position on a can as described above.

The side sections 54 and 55 of the yoke 53 may be of reduced cross sectional area to provide any desired degree of flexibility or spring in the yoke and thus accomplish the purpose of the flexible sections of the fulcrum shown in FIGS. 1, 8 and 19.

It will be noted in connection with the use of any of the species of fulcrum described herein that when the plane of the fulcrum is tilted in relation to the longitudinal axis of the cylindrical can, the arc shaped can body encircling sections or members of the fulcrum will contact with a portion of an elliptical line around the can.

It will be understood that the plane of each species of fulcrum described herein is considered as being a plane through the curved arcs or can body encircling members of the fulcrum and that the references made to "tilting the plane" of the fulcrum are to be construed as meaning the movement of the fulcrum to a position where the section to be engaged by a can top puncturing tool is near or at the top of the can and the opposite side of the fulcrum is positioned lower down on the can.

It will also be understood that "tilting the fulcrum" or "tilting the plane of the arc sections" or "tilting the can body encircling members" is to be construed as meaning a change in the angle of the plane of the fulcrum or of the can body encircling sections, relative to the longitudinal axis of the can, and in the direction across the center of the fulcrum from the point where the fulcrum is, or is to be, engaged by the can opening tool. In every case the "tilting" will be understood to imply sufficient motion to cause the fulcrum to grip the can body by frictional engagement.

It is particularly pointed out that the integral fulcrum as shown in all of the species described herein, is formed substantially in fixed or unchangeable shape and size to receive the can and when in use on a can, the upward pull on the fulcrum, caused by the operation of the can puncturing tool, will automatically tighten the fulcrum on the body of the can (by tilting the fulcrum in relation to the longitudinal axis of the can) and thus cause the fulcrum to automatically grip the body of the can and clamp the fulcrum on the can. This feature of automatic grip on the can distinguishes the invention herein from devices which require the manual gripping of the can by the operator in connection with their use to puncture the can.

I claim:

1. A device for use in puncturing a can comprising a shaped integral body member substantially lying in a plane and of such shape to receive and grip the body of said can and provided with an upward extension to provide a fulcrum for a can puncturing tool and a handle section for said member.

2. A device for use in puncturing the top of a can comprising:
 (a) a fulcrum member of fixed shape to receive said can;
 (b) said fulcrum member in use being adapted to automatically grip said can body and be held in place thereon solely by friction between said can body and said fulcrum;
 (c) said fulcrum having a handle section to assist in placing said fulcrum in position on said can;
 (d) said fulcrum member having a section adapted to engage with a puncturing tool and cooperate in the puncturing of said can top.

3. A device to cooperate with a can top puncturing tool to open a metal can comprising:
 (a) a fulcrum member lying mostly in one plane and of a size to slide in close fit on said can body when said plane is perpendicular to the longitudinal axis of said can;
 (b) said fulcrum member having a handle;
 (c) a section of said fulcrum member being adapted to engage said puncturing tool and
 (d) said fulcrum member being tilted on said can body to obtain a frictional grip on said can body, by which said fulcrum member is held in operating position on said can body when said can top is punctured by said tool.

4. A device to cooperate with a can top puncturing tool to open a metal can comprising:
 (a) a fulcrum member lying mostly in one plane and of a size to slide in close fit on said can body when said plane is perpendicular to the longitudinal axis of said can;
 (b) said fulcrum member having a handle;
 (c) a section of said fulcrum member being extended upward to engage said puncturing tool and
 (d) said fulcrum member being tilted on said can body to obtain a frictional grip on said can body, by which said fulcrum member is held in operating position on said can body when said can top is punctured by said tool.

5. A device applied to a metal can to engage with and provide a fulcrum for a conventional can top puncturing tool to open said can comprising at least:
 (a) a fulcrum member lying mostly in one plane;
 (b) said fulcrum being of a size to slide in close fit on said can body when said plane is perpendicular to the longitudinal axis of said can;
 (c) said fulcrum having a handle;
 (d) said fulcrum having an upper open loop section substantially in contact with said can body to engage with and position said tool immediately adjacent to said can body whereby the full length of the cutting jaw of said tool is operative to puncture the can top to its edge and (e) said fulcrum being smooth inside to make frictional contact with and grip said can body, when tilted on said can body, to hold said fulcrum by friction in operating position on said can body when said can top is punctured by said tool.

6. A device applied to a metal can to engage with and provide a fulcrum for a conventional can top puncturing tool to open said can comprising at least:

(a) a fulcrum member lying mostly in one plane;

(b) said fulcrum being of a size to slide in close fit on said can body when said plane is perpendicular to the longitudinal axis of said can;

(c) said fulcrum having an upper open loop section substantially in contact with said can body to engage with and position said tool immediately adjacent to said can body whereby the full length of the cutting jaw of said tool is operative to puncture the can top to its edge and (d) said fulcrum being smooth inside to make frictional contact with and grip said can body, when tilted on said can body, to hold said fulcrum by friction in operating position on said can body when said can top is punctured by said tool.

7. A device applied to a metal can to engage with and provide a fulcrum for a conventional can top puncturing tool to open said can comprising at least:

(a) a shaped integral fulcrum member to receive said can;

(b) said fulcrum having an upper open loop section substantially in contact with said can body to engage with and position said tool immediately adjacent to said can body whereby the full length of the cutting jaw of said tool is operative to puncture the can top to its edge and (c) said fulcrum being smooth inside to make frictional contact with and grip said can body, to hold said fulcrum by friction in operating position on said can body when said can top is punctured by said tool.

References Cited in the file of this patent
UNITED STATES PATENTS

| | | |
|---|---|---|
| 130,806 | Johnson | Aug. 27, 1872 |
| 470,710 | Shay | Mar. 15, 1892 |
| 1,011,358 | Moseley | Dec. 12, 1911 |
| 1,018,266 | Polakovich | Feb. 20, 1912 |
| 1,415,676 | Morgan | May 9, 1922 |
| 1,618,304 | Nachtigal | Feb. 22, 1927 |
| 2,412,946 | Bloomfield | Dec. 24, 1946 |
| 2,637,897 | Nelson | May 12, 1953 |
| 2,770,876 | Teitelbaum | Nov. 20, 1956 |
| 2,800,712 | Jernegan | July 30, 1957 |
| 2,823,452 | Segal | Feb. 18, 1958 |